United States Patent
Eriksson et al.

(10) Patent No.: US 6,661,806 B1
(45) Date of Patent: Dec. 9, 2003

(54) RESOURCE RESERVATION

(75) Inventors: Anders Eriksson, Bandhagen (SE); Christian Gehrmann, Hägersten (SE)

(73) Assignee: Telefonaktiebolaget LM Ericsson(publ), Stockholm (SE)

(*) Notice: Subject to any disclaimer, the term of this patent is extended or adjusted under 35 U.S.C. 154(b) by 0 days.

(21) Appl. No.: 09/195,941

(22) Filed: Nov. 19, 1998

(30) Foreign Application Priority Data

Nov. 21, 1997 (GB) .............................................. 9724697

(51) Int. Cl.[7] ............................................... H04J 3/24
(52) U.S. Cl. ...................... 370/468; 370/310.2; 370/443
(58) Field of Search ............................... 370/310, 310.1, 370/310.2, 321, 329, 337, 347, 348, 395.2, 395.21, 468, 458, 431, 442, 444, 443, 229, 230

(56) References Cited

U.S. PATENT DOCUMENTS

| | | | | |
|---|---|---|---|---|
| 4,813,037 A | * | 3/1989 | Debuysscher et al. ....... | 370/392 |
| 5,315,586 A | * | 5/1994 | Charvillat .................... | 370/60 |
| 5,367,517 A | * | 11/1994 | Cidon et al. .................. | 370/54 |
| 5,535,207 A | * | 7/1996 | Dupont ......................... | 370/80 |
| 5,574,724 A | * | 11/1996 | Bales et al. .................. | 370/68.1 |
| 5,680,398 A | * | 10/1997 | Robinson ..................... | 370/458 |
| 5,742,592 A | * | 4/1998 | Scholefield et al. ......... | 370/329 |
| 5,812,526 A | * | 9/1998 | Chang et al. ................. | 370/230 |
| 5,825,811 A | * | 10/1998 | Souissi ......................... | 375/133 |
| 5,842,007 A | * | 11/1998 | Tarsky et al. ................ | 712/225 |
| 5,878,029 A | * | 3/1999 | Hasegawa et al. .......... | 370/326 |
| 5,953,338 A | * | 9/1999 | Ma et al. ...................... | 370/395 |
| 5,970,062 A | * | 10/1999 | Bauchot ....................... | 370/345 |
| 6,021,132 A | * | 2/2000 | Muller et al. ................ | 370/412 |
| 6,081,525 A | * | 6/2000 | Christie et al. .............. | 370/392 |
| 6,091,740 A | * | 7/2000 | Karasawa .................... | 370/458 |
| 6,205,154 B1 | * | 3/2001 | Schmidt et al. .............. | 370/458 |
| 6,205,484 B1 | | 3/2001 | Eriksson ....................... | 709/229 |

(List continued on next page.)

FOREIGN PATENT DOCUMENTS

| | | |
|---|---|---|
| EP | 0522391 A2 | 1/1993 |
| EP | 0534493 A2 | 3/1993 |
| EP | 0603099 A2 | 6/1994 |
| EP | 0609654 A2 | 8/1994 |
| EP | 0719012 A2 | 6/1996 |
| WO | WO 97/50213 | 12/1997 |

OTHER PUBLICATIONS

Long, K.; Patents Act 1977–Search Report Under Section 17(5); Jun. 23, 1998; App. No. GB 9724697.9; pp. 1–3.
Lievens, K.; International Search Report; Apr. 27, 1999; App. No. PCT/EP98/07354; pp. 1–3.
Eriksson, A.; "Real–Time Services Over the Internet," XVI World Telecom Congress Proceedings; Sep. 21, 1997; pp. 173–179.
White, P.P.; "RSVP and Integrated Services in the Internet: A Tutorial," IEEE Communications Magazine; May 1997; pp. 100–106.
Ramakrishnan, K.K. and Newman, P.; "ATM Flow Control: Inside the Great Debate," Data Communications, No. 8, Jun. 24, 1995; pp. 111–114, 116, 118, 120.

*Primary Examiner*—Douglas Olms
*Assistant Examiner*—Van Kim T. Nguyen

(57) ABSTRACT

A method is provided for achieving admission control to a public connectionless packet network. This provides a method of access control which allows service differentiation in a form which permits a user to receive a quality of service guarantee which is better than a "best effort" service. Each transmission by a user across the network includes a ticket message sent to the user from the network. The ticket message includes information about the priority level of the transmission, and can be used in a connectionless network to determine the resources available for future transmission requests.

11 Claims, 4 Drawing Sheets

U.S. PATENT DOCUMENTS 6,216,006 B1 * 4/2001 Scholefield et al. ......... 455/450
6,236,656 B1 * 5/2001 Westerberg et al. ......... 370/395
6,243,387 B1 * 6/2001 Hjalmtysson et al. ....... 370/410
6,243,391 B1 * 6/2001 Holmquist .................. 370/458
6,400,701 B2 * 6/2002 Lin et al. .................... 370/336
6,434,183 B1 * 8/2002 Kockmann et al. .......... 375/132
6,438,136 B1 * 8/2002 Bahl ........................... 370/458
6,463,075 B1 * 10/2002 Hoebeke ..................... 370/458
6,480,506 B1 * 11/2002 Gubbi ........................ 370/468

* cited by examiner

RESOURCE RESERVATION

TECHNICAL FIELD OF THE INVENTION

This invention relates to the field of resource reservation, and in particular to a method of controlling access to a communications network, and to components of a network using such a method.

DESCRIPTION OF RELATED ART

The Internet is a communications network which is becoming widely available. The Internet provides a "best effort" bearer service. That is, the user receives the best service available at the time he requests it, but no commitments are given to the user in terms of available bandwidth, transit delay, or packet loss. The Internet is particularly useful in data communications applications, but is of limited use for telecommunications applications which require guaranteed bandwidth availability, and specify maximum values for the transit delay and loss of data. The Internet cannot usually guarantee the required quality of service.

One conventional way of achieving resource reservation, to be able to provide a required quality of service commitment, is to use connection states to store information in the network nodes about bandwidth, buffer parameters, connection identity and status. However, an advantage of the Internet is that it is a connectionless network, which therefore cannot use this technique without sacrificing the simplicity of the Internet.

One conventional way of achieving bearer service differentiation, in a connectionless network, is to use a set of priority bits in the packet header. However, in a public connectionless network, it is still necessary to control how many connections use the highest available priority. If every connection uses the highest available priority, the network can still in effect only offer a best effort service to the users.

A problem remains, therefore, as to how to control admission to the network.

TECHNICAL FIELD OF THE INVENTION

The present invention seeks to solve the problem of achieving admission control and resource reservation in a connectionless network.

According to the invention, each transmission by a user across the network includes a message sent to the user from the network. The message includes information about the priority level of the transmission, based on the user's contract with the network provider, and can subsequently be extracted by the network to determine how to handle the transmission.

Thus, rather than rely on the network being able to detect the status of the connection, the relevant information is transmitted by the user with the data transmission, and can be extracted by the network as required.

In preferred embodiments, this information can be used for admission control and for routing purposes.

For a better understanding of the present invention, and to show how it may be brought into effect, reference will now be made, by way of example, to the accompanying drawings.

DETAILED DESCRIPTION OF PREFERRED EMBODIMENTS

Figure 1:
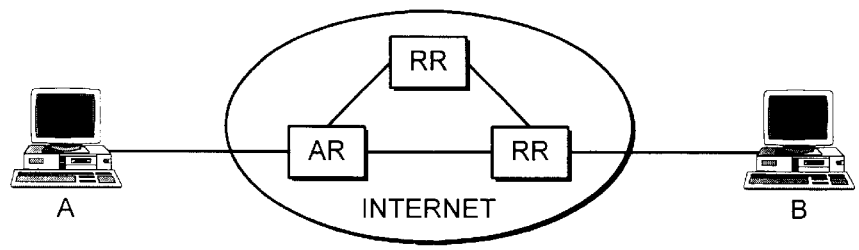
FIG. 1 is a schematic representation of a network in accordance with the invention.

FIG. 1 represents a network in accordance with the invention. In FIG. 1, a user at terminal A intends to send a message, in the form of data packets, to terminal B across the Internet. The Internet includes a large number of nodes, of which only a small number are shown in FIG. 1. These are designated real-time routers RR, while the node to which the terminal A is connected is designated the access router AR.

In accordance with preferred aspects of the invention, each node in the network, including users who may wish to send or receive data packets, has an internal clock. The clock at each node is used to measure time slots of size T0 seconds, where T0 is an arbitrary period of perhaps several seconds, chosen to be reliably greater than the maximum network transport delay. The nodes and terminals are synchronized to the network clock reference.

As described herein, it is assumed that the network is able to support resource reservation from end to end. However, it will be appreciated that the invention is equally applicable when resource reservation is only available over a specific network domain, covering only a part of the end to end path. In such a case, the reservation protocol is terminated by the routers at the edges of that network domain.

Resource reservation for a user data flow may be supported by different types of reservation protocols along the end-to-end path of the flow. For example, the protocol according to an aspect of the invention may be used over a specific network domain, covering only a part of the end-to-end path. An interworking function is then needed between the network domain supporting the protocol according to the invention and adjacent network domains using other types of reservation protocols. As a special case, an arbitrary type of reservation protocol can be used for the signalling between the user and the access node, while the network internal signalling is performed with the protocol according to the invention. The interworking function between the two types of reservation protocol is then located in the access node.

Although the invention is described herein with reference to the Internet, it is applicable to any connectionless packet network, whether public or private.

In accordance with preferred embodiments of the invention, the sender has a traffic contract with its network provider, under which a particular quality of service is guaranteed. This allows the network provider to offer service differentiation to users. Thus, users who are prepared to pay higher charges are able to guarantee access to higher bandwidths, or higher priority traffic handling.

The flow of signalling messages during a data transmission will now be described with reference to FIG. 2, while the steps taken in the access router AR will be described with reference to the flow chart of FIG. 3.

Figure 2:
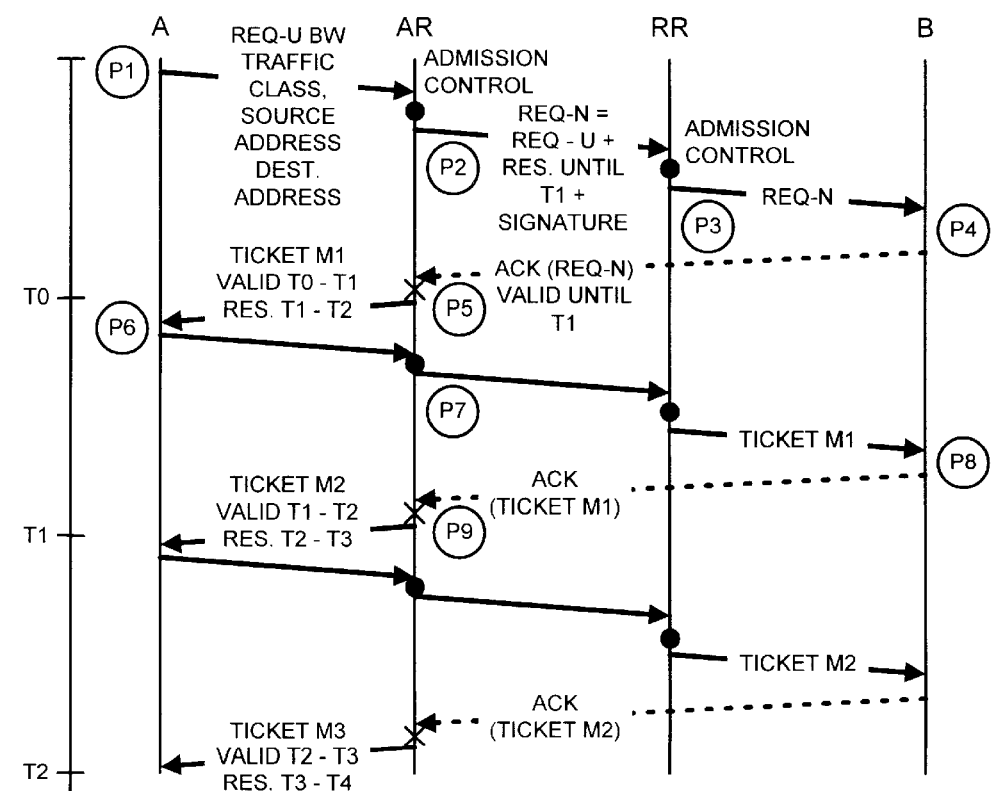
FIG. 2 illustrates the flow of signalling messages in accordance with the invention.
Figure 3:
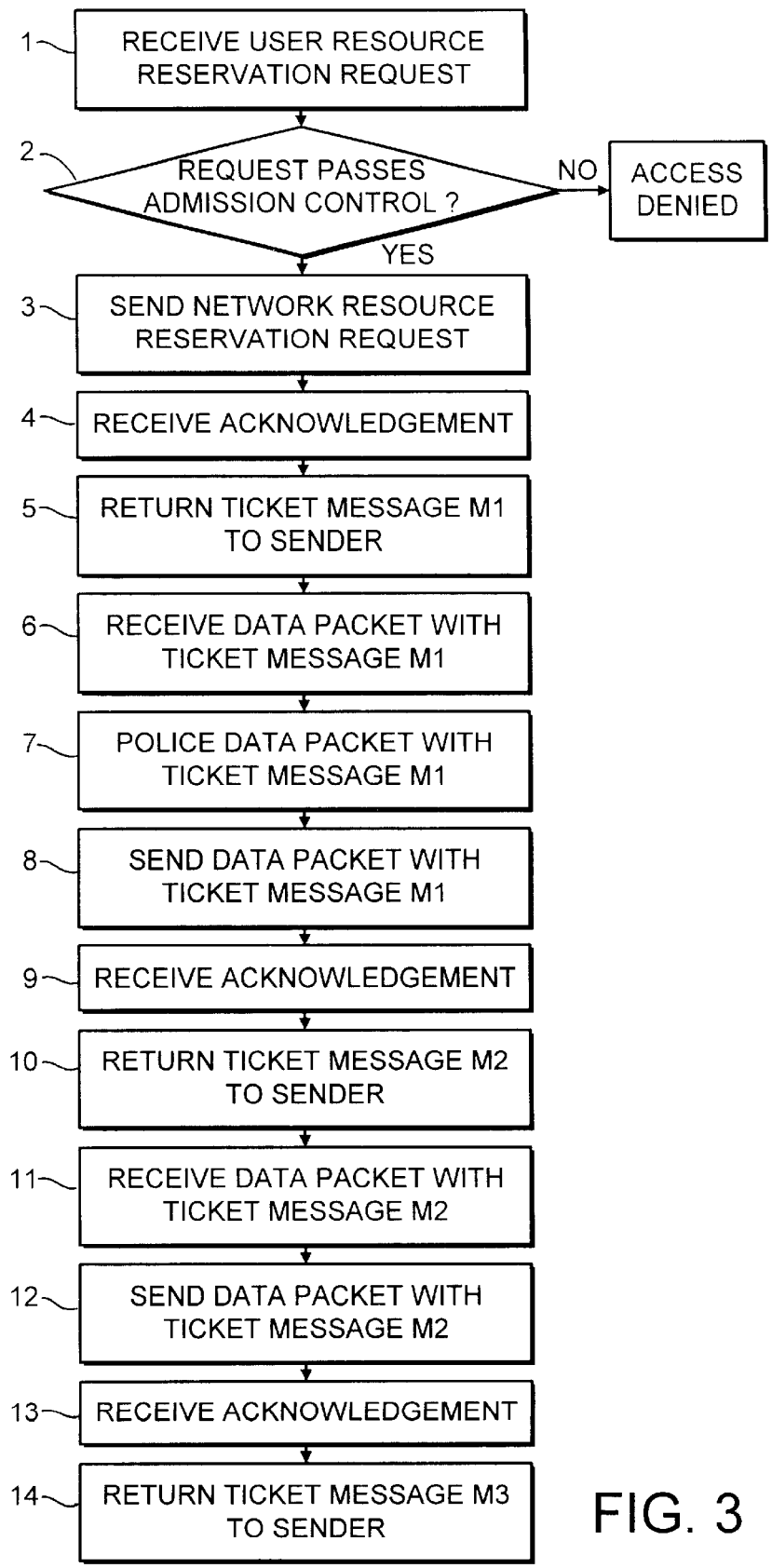
FIG. 3 is a flow chart indicating the steps taken in a method in accordance with the invention.

When the sender wishes to initiate a data transmission, a user resource reservation request REQ-U is sent from the terminal A at point P1 in FIG. 2, and received at the access router AR in step 1 of the method of FIG. 3. The resource reservation request specifies the required bandwidth for the transmission, the required traffic class, the source address and the destination address. These parameters are thus set for the duration of the transmission at this stage.

In step 2 of the method, it is determined at the access router AR whether the resource reservation request passes the admission control. This admission control is performed in a way which is described in more detail below. If the resource reservation request does not pass the admission control, the request is denied.

As described in more detail below, the information needed for admission control is not stored in the network on a per connection basis, but can be extracted by the network as required from messages associated with every transmission which gains access to the network. Thus, these messages must contain all information which is necessary to allow the network nodes to perform admission control and policing of the transmission as required.

If the resource reservation request passes the admission control, the method passes to step 3 at point P2. Here, the access router AR sends a network resource reservation request REQ-N across the Internet to the terminal B. Each node in the transmission path can perform resource reservation and admission control. For example, at point P3, admission control is carried out by the node RR. If the required bandwidth is available across the network, an acknowledgement ACK is sent from the terminal B to the access router AR at point P4, and received in step 4 of the method.

Following receipt by the access router AR of the acknowledgement message ACK, required information about the state of the connection is passed from the network to the user A at point P5 and in step 5 of the method. Specifically, information about the resources allocated to the connection, and other connection parameters (for example those specified in the traffic contract) is sent from the access router AR to the sender A in a ticket message M1. The information in the ticket message M1 is preferably protected by a digital signature, to prevent its alteration by the user A.

The calculation of the digital signature is described in more detail below.

The ticket message has a function which is similar in some ways to the priority bits which can be added to a packet header before transmission across a connectionless network. However, the ticket message used in accordance with the invention is determined by the network itself, so that it becomes possible to ensure that users receive a service which is in accordance with their quality of service guarantees, and ensures that users cannot reserve high priority resources which go beyond those guaranteed.

In one embodiment, the user must still set priority bits in a conventional way, but the ticket message, determined by the network and transmitted by the user with the data flow, states which priority levels may validly be set by the user for a particular data flow.

As discussed in more detail below, the ticket message T1, sent in step 5 of the method shown in FIG. 3, is sent at time T0, and is valid for the time slot of duration $T_0$ from T0 until T1. Moreover, as will be described in more detail below, the ticket also allows the node A to reserve bandwidth for the subsequent time slot, namely from T1 until T2. The reason for this will be described in more detail below with reference to the admission control which is performed at the node AR.

On receipt of the ticket message M1, the sender A, at point P6 in FIG. 2, sends a data packet, together with the ticket message M1.

At point P7 in FIG. 2, and in step 7 of the method, the node AR is now able to police the data packet, by confirming that it complies with the original request REQ-U, in respect of which the ticket message M1 was issued.

Assuming that the data packet does comply with the requirements specified in the ticket message, it is transmitted in step 8 of the method to the subsequent node RR, and hence to the receiving terminal B.

At point P8 in FIG. 8, the receiving terminal B sends an acknowledgement message ACK, which is returned to the access node AR, and received in step 9 of the method.

At point P9 in FIG. 2, and in step 10 of the method, a further ticket message M2 is then returned to the sending terminal A. This ticket message M2 is valid for the time slot from time T1 until T2, and effectively reserves band width for the subsequent time slot from time T2 until T3, as discussed above with reference to the message M1.

The process then cycles until such time as the sending terminal A has completed transmission. Thus, in step 11 of the method, a further data packet containing the ticket message M2 is received at the node AR.

The method for performing admission control at a network node will now be described in more detail. In accordance with the invention, admission control is performed in each node of the network. Admission control is carried out on the basis of policy rules (for example, does the sender have a service contract which allows him to send a specific message type to a particular destination at a particular time), and on the basis of availability of resources. Admission control on the basis of policy rules is carried out in a conventional way, while admission control on the basis of availability of resources is described further herein.

As mentioned above, each node in the network has an internal clock, which works on the basis of time slots of length $T_0$.

In one embodiment, the phase of the periodical transmission of ticket messages from terminals is synchronised to a common reference, and the beginnings of the time intervals within the network nodes are synchronised to the same reference. Moreover, the time slot length $T_0$ is chosen to be longer than the worst case network transport delay. In this way, all tickets can be transmitted at times which guarantee that they arrive at network nodes at a safe distance from the edges of any time slot, thus ensuring that the tickets will be received within the intended time slot. It is this situation which is illustrated in FIG. 2.

However, in an alternative embodiment, the clocks in the different nodes need not be synchronised.

As described above, a ticket message issued from an access router to a sending terminal, comprises in effect a permission to transmit a packet with a specific band width at priority level until the ticket expires. The ticket is typically valid for one time slot, which may for example have a duration of a few seconds. In the event that the user wishes to transmit data for a longer period, it is undesirable to force that user to make a completely new reservation request, with the associated risk that the request would be denied if resources were unavailable. Rather, in accordance with the invention, a user having an established reservation has a higher priority, when renewing that reservation, than a user requesting a new reservation.

Thus, as described above with reference to FIG. 2, each ticket message M1, M2, M3, transmitted from the access router AR to the sending terminal A is itself valid for a current time period in order to prove that resources have been reserved for that time period, but is also valid to make a resource reservation for the immediately subsequent time slot.

When the sending or receiving terminal wishes to terminate the reservation, a received ticket message can simply be discarded, and not returned to the access router. The loop is thus broken, and no new tickets are issued. The links along the path from sending terminal to receiving terminal will then calculate a decrease in the reserved bandwidth, and will thus be able to allocate more bandwidth for new resource reservations.

Alternatively, if a sending terminal wishes to release bandwidth which has been reserved, it can send a release ticket message to the access router at any time.

In addition, if, for any reason, a sending terminal does not receive a new ticket at an expected time, it transmits with its next packet of data a non-acknowledged ("NACK") ticket message in its place. This ticket NACK contains exactly the same information as the previously transmitted ticket. For the purposes of bandwidth reservation, one such non-acknowledged ticket message NACK can be treated as a valid renewal request.

We can define an admission decision rule for the nodes in the network. Assume that a node gets a request for bandwidth $B_r$ on a link during time slot $t_n$, i.e., it is necessary to decide whether to admit the flow for time slot $t_n$. The admission decision is made on the basis that:

$$B_{max} - B_r - B_a(t_n) - B_{req}(t_n) + B_{rel}(t_n) \begin{array}{l} \geq 0 \text{ yes} \\ < 0 \text{ no} \end{array}$$

where
- $B_{max}$ is the maximum bandwidth that can be supported on the link.
- $B_a(t_n)$ is the total new bandwidth admitted on the link for time slot $t_n$.
- $B_{req}(t_n)$ is the requested and admitted bandwidth so far on the link for time slot $t_n$.
- $B_{rel}(t_n)$ is the bandwidth on the link released so far for time slot $t_n$.

Thus, the decision rule only depends on the internal time intervals within the nodes and the decision rule is the same, independent of whether the network is synchronised or not. Furthermore, this rule gives a "yes" if and only if indeed the requested bandwidth can be supported by the link.

Thus, the node stores link states, each containing the aggregate reserved bandwidth on a link, but does not store the reserved bandwidth allocated to a particular connection, although it can obtain this information from a ticket message sent on the connection.

Then, let $$B_\Delta(t_n) = B_a(t_n) - B_m(t_n),$$

and let $$B_m(t_0) = B_a(t_0) = B_a(t_1) = 0.$$

We update $B_a$ at the end of time slot $t_n$ as:

$$B_a(t_{n+1}) = B_a(t_n) + B_{req}(t_n) - B_{rel}(t_n) - \max(0, B_\Delta(t_{n-1}) - B_{nack}(t_n))$$

where:
- $B_m(t_n)$ is the bandwidth on the link measured from the "renew" and "NACK" tickets during time slot $t_n$.
- $B_{nack}(t_n)$ is the total bandwidth on the link from "NACK" tickets during time slot $t_n$.

The result is that, if a sender stops sending tickets and there are no lost tickets deeper in the network, the bandwidth is released after two internal time intervals in all the nodes. This works independent of the clocks of the different nodes.

The reason for using $\max(0, B_\Delta(t_{n-1}) - B_{nack}(t_n))$ to update $B_a(t_{n+1})$ instead of just $B_\Delta(t_{n-1}) - B_{nack}(t_n)$, is that if some bandwidth measured at the node is associated to a ticket which is lost deeper in the network, $B_\Delta(t_{n-1)-Bnack}(t_n)$ might be greater than zero. If this is the case we should obviously not reserve more bandwidth than we already have reserved.

Figure 4:
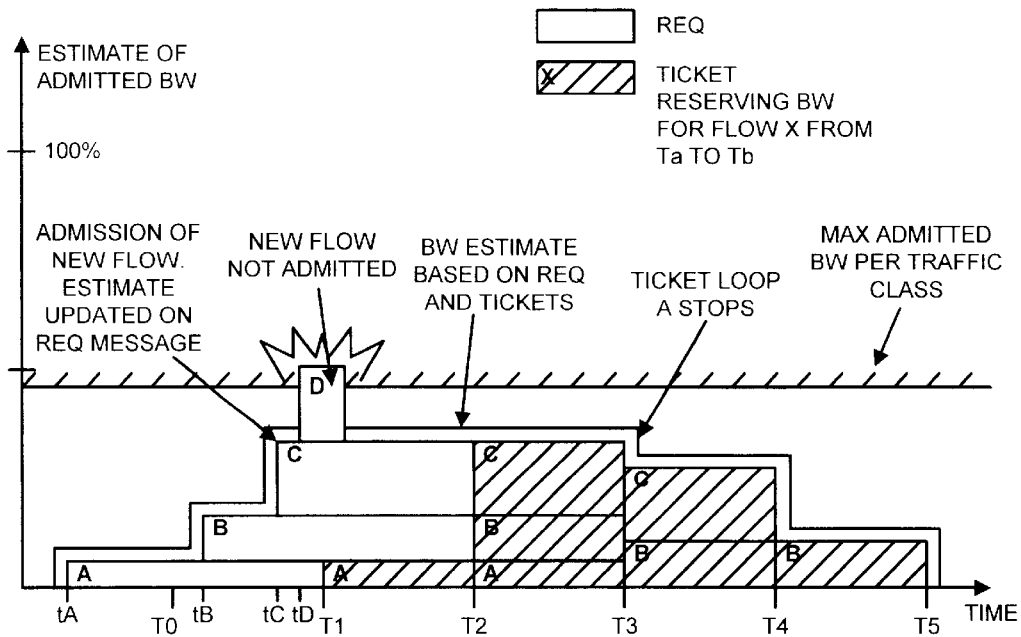
FIG. 4 is a graphical representation of an admission control procedure in accordance with one aspect of the invention.

This form of admission control is illustrated graphically in FIG. 4.

In the example of FIG. 4 the vertical axis represents the current estimate of the admitted bandwidth, while the horizontal axis is the time axis. The time at the particular node is divided into slots, as previously discussed, with the end points of the slots being designated T0, T1, T2, and so on. Thus, in FIG. 4, each rectangle represents a reservation or reservation request, with the height thereof representing the bandwidth required. White rectangles represent reservation requests, while shaded boxes represent allocated tickets which reserve bandwidth during a particular time slot.

Thus, in FIG. 4, at point tA, a bandwidth reservation request is received, and this remains valid for the time until T0, and for the whole of the subsequent time slot until T1. At time tB, a second reservation request is received, and this remains valid until the next end point T1, and for the whole of the subsequent time slot until time T2. A third reservation request is received at time tC, and, at each of these points, the estimate of admitted bandwidth is updated to include bandwidths requested in the most recently received reservation request.

At time tD, a fourth reservation request is admitted, but the required bandwidth therefor is such that, to admit that flow would result in the estimate of admitted bandwidths exceeding the maximum bandwidth for that particular traffic class. Thus, the fourth reservation request is not admitted.

At end point T1, the ticket issued in respect of reservation request A becomes valid, and so, for the time slot from T1 until T2, the bandwidth estimate is based on the bandwidth allocated by that ticket, and by the reservation request B and C.

During the time slot from T2 until T3, tickets for the three flows A, B and C are all valid. At time T3 ticket loop A stops, and so the estimate of admitted bandwidths falls. Similarly, at time T4, ticket loop C stops, and the estimate of admitted bandwidth falls again. Finally, at time T5, ticket loop B stops, and the estimate of admitted bandwidth falls to zero.

The discussion of admission control above has been on the basis that the network nodes are synchronised. However, as previously mentioned, the method and apparatus of the present invention may allow the use of a non-synchronised network, by an appropriate modification of the ticket messages. To achieve this, each node in the network works with internal time slots which are alternately designated "0" and "1". When a node receives a ticket request, it then includes in the ticket a synchronisation bit which corresponds to the designation of the time slot in which the ticket request has been received. This ensures that, although the different nodes in the network are not synchronised with each other, it is always possible to deduce the time slot in which a request has been received. The lack of synchronisation may mean that it is otherwise not possible to tell in which of two adjacent time slots a request has been received, but the synchronisation bit will always allow that distinction to be made.

If a resource reservation request is allowed, that is, it passes the admission control, a ticket is issued as mentioned above.

Figure 5:
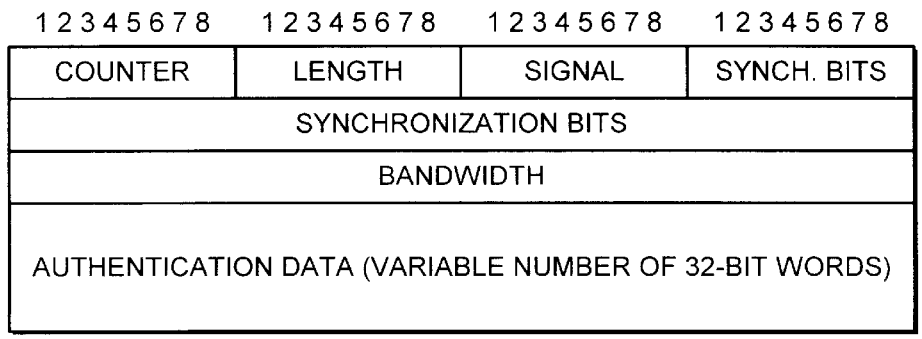
FIG. 5 illustrates a ticket protocol in accordance with an aspect of the invention.

The ticket protocol, defining the form of the ticket, will now be described in more detail with reference to FIG. 5. As will be apparent, the ticket needs to include source and destination addresses and an indication of priority in the IP-header, but must also contain other relevant information, which is preferably set out in a format as shown in FIG. 5, and as described below.

Counter 8 bits wide. A counter filed initialized to zero and incremented at each node where a synchronisation bit is used. This field is used for the nodes to find the correct synchronization bit.

Length 8 bits wide. The length of the Authentication data field in 32 bit words.

Signal 8 bits wide. Information of type of ticket message.

Synchronization bits 40 bits wide. The synchronisation bits used by the nodes. This implies that a maximum of 40 admission nodes can be used for a non synchronised network.

Bandwidth 32 bits wide. The reserved bandwidth over the link.

Authentication data. The length of this field is variable, but is always an integral number of 32-bit words.

If only the access node uses the authentication data it would be convenient to only use a 32-bit authentication data field. If more nodes will use authentication data for the digital signature, we suggest that the authentication data field should be used as a stock where each node which uses an authentication data field either add or remove the authentication data from the stock. A default length of an authentication tag should be 32 bits.

A method for calculating the digital ticket signatures is now described. As mentioned above, all the nodes in the network have internal time slots, and successive time slots of the access node are designated as $t_1, t_2, t_3, t_4, \ldots$ Each slot has a duration of time $T_0$.

Each node, which wants to be able to put a signature to a ticket, holds one general key and one series of time keys. The series of time keys is generated and kept internally within the node, and never transmitted to any location outside the node. The general key is denoted by k and the time dependent keys by $k_1, k_2, k_3, k_4, \ldots$, where each time interval $t_n$ is associated with a specific key $k_n$. The parts of the ticket message to be protected are denoted by m, and the ticket signature associated with this ticket message by $s_m$. Thus, an authenticated ticket message issued by a real time node at slot $t_n$ consists of m concatenated with $s_m$, i.e., $[m, s_m]_n$. To sign a ticket message which arrives at the node time interval $t_n$ we use the keys k and $k_{n+1}$ to sign the ticket message m. Let f be the signing function, thus, $$[m, s_m]_n = [m, f(m, k, k_{n+1})]$$

The signing function f can be chosen using the authentication method proposed in J. L. Carter and M. N. Wegman, "New hash functions and their use in authentication and set equality", Journal of Computer and System Sciences, vol. 22, pp. 265–279, 1981 or B. den Boer, "A simple and key-economical unconditionally secure authentication scheme", Journal of Computer Security, vol. 2, pp.65–71, 1993, and T. Johansson, G. Kabatianskii and B. Smeets, "On the relation between A-codes and codes correcting independent errors", Proceedings of Eurocrypt '93, LNCS 765, Springer-Verlag, pp.1–11, 1993. The latter method is briefly described below.

Assume that we can rewrite m in the following way $m=(m_1, m_2, \ldots, m_n)$, where each $m_i \in CF(2^r)$, i.e., an element in the finite field consisting of r bits. If m not is a precise multiple of r bits we may assume that we pad 0 bits to m such that the length equals a multiple of r. Furthermore, assume that $k_1, k_{n+1} \in GF(2^r)$. Now, we use the following formula to calculate $s_m \in GF(2^r)$:

$$s_m = f(m, k, k_{n+1}) = k_{n+1} + m_1 \cdot k + m_2 \cdot k^2 + \ldots + m_l \cdot k^l.$$

This gives a probability for anyone, who only observes one signature signed with $k_n$, to succeed in changing m without detection by the access node, of:

$$\frac{l}{2^r},$$

independent of the computing power of the adversary.

To verify a ticket signature at time period n, the node uses the keys k and $k_n$ to verify the signature according to the formula above, i.e., it uses the present key to check a signature and the key for the next slot for calculating a new ticket signature. The key to be used is determined by the slot at which a ticket arrives downstream at a node. Thus, in the case when the network nodes are not synchronised when the access node puts its signature to the ticket before forwarding it to the sender, it has to use the synchronisation bit to be able to determine the correct key for calculating the signature, i.e., the key corresponding to the slot time $T_0$ from when the ticket first arrived at the access node. The access node may preferably protect the source and destination addresses in the IP-header and all ticket fields except the signal field. Nodes deeper in the network which want to authenticate the ticket should protect the source and destination addresses and the reserved bandwidth.

Thus, the use of a signature generated using a key which is unique to a particular time slot allows the node to verify that a received ticket has validly been issued in respect of the time slot in which it is received.

Incidentally, since the source might not have a perfect clock, and due to the transmission delay, the access node should preferably accept signatures calculated both with key $k_n$ and $k_{n+1}$ around the transition from time interval $t_n$ to $t_{n+1}$.

In accordance with aspects of the invention, the use of ticket messages can also allow management of traffic flows in the event that a route from sender to receiver must be changed. A node within a network has a routing table, which determines the output post to which traffic for a particular destination must be sent. The routing tables are updated quite frequently, for example due to routine traffic management procedures, a change in the network topology, or a link failure.

In a connectionless network a router immediately re-routes all the traffic related to a specific entry in the routing table when that entry is updated. This works for best effort traffic but is not allowed for already established connections with reserved resources, which first must pass an admission control along the new path. Therefore a mechanism must be introduced to prevent this immediate rerouting of traffic with reserved resources.

In accordance with this aspect of the invention, prior to the replacement of an output link in a routing table entry, the traffic on the link is stopped by discarding all tickets, thus breaking the ticket loop. Moreover, the reserved traffic that is routed according to the changed entry is given the low priority of unreserved traffic. The user must thereafter initiate a new reservation request in order to reserve resources along the new path.

The mechanism works as follows: suppose that the routing table changes from the "old" to the "new" set of router output ports in Table 1. As can be seen, the traffic that was previously routed to output port C is now routed to output port A or B. Since the traffic that has been rerouted has not passed any admission control on the new output ports, the ticket messages must be stopped, and the priority of the payload packets must be reset to the low priority of unreserved traffic.

TABLE 1

| destination address | old output port | new output port |
| --- | --- | --- |
| destination address 1 | port C | port A |
| destination address 2 | port A | port A |
| destination address 3 | port B | port B |
| destination address 4 | port C | port B |

This is achieved by introducing a temporary "switch-over" state for the entries in the routing table with a changed output port. Packets which are routed according to the "switch-over" state are given the low priority of unreserved traffic, and ticket messages are dropped. The principle is illustrated in Table 2, which shows the routing table with the "switch-over" state.

TABLE 2

|  | old output port | switch-over state | new output port |
| --- | --- | --- | --- |
| dest address 1 | port C | port A + drop ticket, lower priority | port A |
| dest address 2 | port A | no change (port A) | port A |
| dest address 3 | port B | no change (port B) | port B |
| dest address 4 | port C | port B + drop ticket, lower priority | port B |

The switch-over state is kept until all ticket loops are broken, which takes two time intervals Ta, and is indicated by the absence of new ticket messages. The ticket protocol is then ready to operate as normal according to the new routing table, and the switch-over state will be terminated.

Since the ticket loop has been broken, the user who wishes to restore the reservation must do this by issuing a new resource reservation request, which will be routed according to the new routing table.

In some cases the change of the routing table is the result of a well controlled network management activity, where the operator has ensured that sufficient resources for the rerouted traffic are available on the new path. Then there is no need to force a new admission control and resource reservation procedure by breaking the ticket loop as described above. The switch-over mechanism should therefore be disabled in this type of controlled rerouting. The user data flow and the ticket messages are then rerouted as soon as the routing table is changed. The resource reservation is controlled by the ticket message and will thus be installed on the new path. Since it is assumed that resources are available on the new path, no admission control procedure is needed when installing the new reservation, and there is thus no need for the user to send a resource reservation request message. The user does not have to be notified about the route change and just continues to send ticket messages as usual.

In a network operating in accordance with aspects of the invention, the sender of the user data flow makes a resource reservation and will in most cases be charged for this reservation. It is therefore natural that the sender will have an interest in the performance of the network service. In order to deliver performance feedback to the sender, the receiving terminal measures the performance of the received packet flow in terms of delay and packet loss. The result of the measurement can then be delivered to the sending terminal by inserting it in the ACK and ticket messages discussed previously and shown in FIG. 2.

In accordance with aspects of the invention, admission control and resource reservation are done on a hop by hop basis, i.e., the decision to accept or reject a reservation is made locally by a resource management entity at each router. However, in some cases it may be advantageous to perform the resource management in a centralised manner. The introduction of resource management into a best effort network can then be achieved by adding a central resource management controller. The need for updating or replacing already installed routes can then be minimized, since they do not need to handle the admission control and resource reservation functions.

Figure 6:
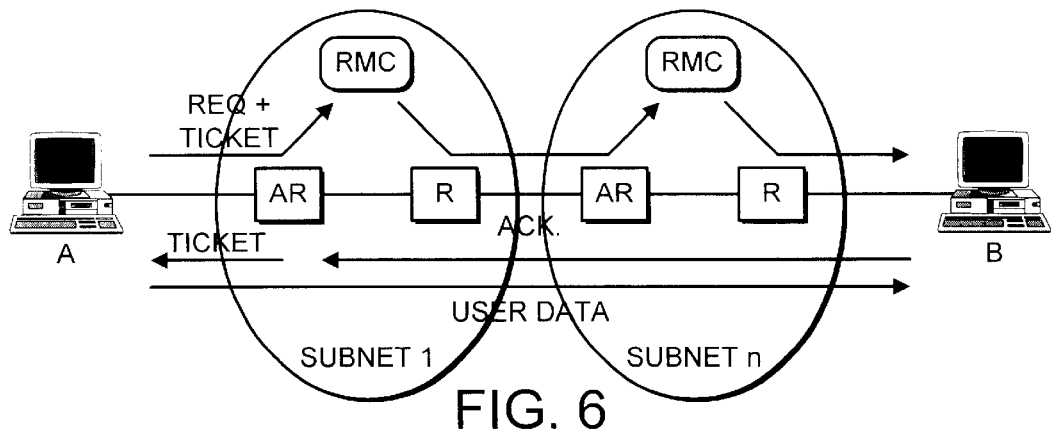
FIG. 6 illustrates a network operating in accordance with an aspect of the invention.

The ticket protocol discussed above might be used in this type of network as described with reference to FIG. 6. FIG. 6 shows a network operating in accordance with an aspect of the invention. The network is divided into subnetworks, of which two (subnet 1 and subnet n) are shown in FIG. 6. Each subnetwork includes a resource management controller (RMC). In the route from sender A to receiver B, the first node within each subnetwork is designated as an access router AR, and there are other nodes, or routers R.

A resource reservation request REQ from the sender A is forwarded to the resource management controller RMC. This controller handles all the admission control and resource reservation within a subnetwork. The controller keeps a record of all the resource reservations within the subnetwork. Based on this information, the controller can perform admission control, i.e. accepting or rejecting a reservation request. If the request is accepted, the request is forwarded to the next subnetwork along the path towards the destination, where the procedure is repeated. If the resources have successfully been reserved all the way to the destination, an acknowledgement will be returned to the access router at the sender, and a ticket message will be sent to the sender by the access router AR. The sender will then periodically forward the ticket message along with the user data. Alternatively, the ticket message may have a duration of only one time slot, as discussed earlier, and may need to be renewed with each data packet, as described with reference to FIGS. 2 and 3.

From the user's point of view, the operation of the ticket protocol is thus independent of whether a resource management controller is used, or whether resource management is performed on a router hop by hop basis.

The user data is forwarded along the optimum path across the network, and does not need to pass the resource management controllers. The ticket message will be routed via the resource management controllers so that they can keep track of the status of each connection.

Figure 7:
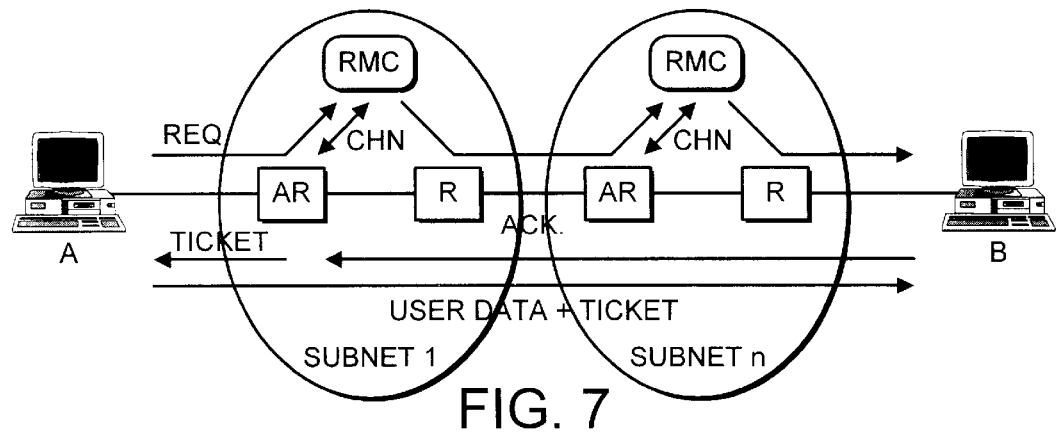
FIG. 7 illustrates a network operating in accordance with another aspect of the invention.

Alternatively, as shown in FIG. 7, the ticket messages can be routed along the same path as the user data. The access routers AR to each subnetwork would then notify its resource management controller RMC only when the ticket message indicates a change in the status of the connection. The latter alternative is advantageous for a large subnetwork where the resource management controller would be overloaded by all the ticket messages. By only sending a notification when the status of each connection is changed, the number of messages to the controller can be reduced.

If all the ticket messages are forwarded to the controller, then it can operate without storing states about each connection. If only change notifications about the status of each connection are sent from the access router to the controller, then both the access router AR and the controller RMC must keep states per connection.

It must also be possible for the resource management controller to terminate the reservation by breaking the ticket loop. This is straightforward when the ticket messages are routed via the controller as in FIG. 7, since it can discard the ticket message. When the ticket messages are routed along with the data, the resource management controller RMC sends a notification to the access controller with an instruction to break the ticket loop for a specific connection by discarding the corresponding ticket message.

It is important to note that the ticket protocol interface between the user and the network is completely independent of whether a resource management controller is used or not. It is thus an internal matter for the network operator whether the network should be based on a centralised resource management controller as described with reference to FIGS. 6 and 7, or if resource reservation and admission control should be performed in a distributed manner by a resource management entity at each router hop.

A further advantage of the invention is that an operator can choose to run his network in a connectionless manner, as described herein, or in a connection oriented mode, using the information in the request and ticket messages to set up a connection state for the data flow. A single message, passing through several operator domains, can pass through networks operating in both modes. It may be advantageous to use a connection oriented mode in an access router to support charging, while the rest of the network operates in a connectionless manner.

There is thus described a system which allows bearer service differentiation in a connectionless network.

What is claimed is:

1. A method of reserving network resources for a transmission, the method comprising:
   at an access node in the network, receiving resource reservation requests from sending network users connected thereto, each resource reservation request specifying an intended destination and a bandwidth requirement;
   in response to each received resource reservation request, performing an admission control procedure;
   in the event that the resource reservation request passes admission control, transmitting a request across the network to the intended destination associated therewith to allow other nodes to perform admission control procedures;
   in the event that the resource reservation request passes all admission control procedures to the intended destination, sending from the access node to the sending network user associated therewith a ticket message containing all necessary connection information; and
   allowing access to the network for a transmission from the sending network user when the transmission includes the ticket message,
   wherein the admission control procedure at the access node determines whether the required resource is available during a time slot by:
      determining what resources have already been allocated during said time slot, and what resources have already been reserved or requested,
   wherein sending a ticket from the access node to the sending network user during a time slot allocates the required resources for said time slot, and reserves the required resources for a second time slot immediately following said time slot.

2. A method as claimed in claim 1, wherein, when the access node receives a transmission from the sending network user including the ticket message, a second ticket message is sent from the access node to the sending network user, wherein sending a ticket from the access node to the sending network user during the second time slot allocates the required resources for said second time slot, and reserves the required resources for a third time slot immediately following said second time slot.

3. A method of reserving network resources for a transmission from a first network user, the method comprising:
   defining a succession of time slots based on a clock signal;
   receiving at a node in the network a resource reservation request from the first network user to initiate a reservation;
   confirming that the required resource is available on a link from said node;
   sending from the network to the first network user a ticket message; and
   allowing access to the network for a transmission from the first network user when the transmission includes the ticket message, the ticket message being valid for a duration of one time slot.

4. A method as claimed in claim 3, wherein successive time slots at said node are denoted by alternating binary values, and the ticket message includes a synchronization bit corresponding to the binary value denoting a time slot in which said ticket message was generated.

5. A method as claimed in claim 3, wherein the ticket message includes a digital signature, calculated on the basis of a key which is used only during a time slot in which said ticket message was generated.

6. A method of reserving network resources for a transmission from a first network user, the method comprising:
   receiving at a node in the network a resource reservation request from the first network user to initiate a reservation;
   confirming that the required resource is available on a first link from said node to a destination address;
   sending from the network to the first network user a ticket message containing connection information; and
   allowing access to the network for a transmission from the first network user when the transmission includes the ticket message,
   wherein, when it is determined that the link is no longer available and that an alternative link must be used, the ticket message is dropped.

7. A method of reserving network resources for a transmission from a first network user, the method comprising:
   receiving at a node in the network a resource reservation request from the first network user to initiate a reservation;
   confirming that the required resource is available on a link from said node;
   sending from the network to the first network user a ticket message containing connection information; and
   allowing access to the network for a transmission from the first network user when the transmission includes the ticket message,
   wherein it is determined whether to allow access to the network on the basis of resources allocated by previous ticket messages, and wherein the ticket message remains valid for a predetermined time period such that, in the event of a network error, the resources allocated thereby are released after expiry of the predetermined time period.

8. A method of reserving network resources for a transmission from a first network user, the method comprising:

receiving at a node in the network a resource reservation request from the first network user to initiate a reservation;

confirming that the required resource is available on a link from said node;

sending from the network to the first network user a ticket message containing connection information; and allowing access to the network for a transmission from the first network user when the transmission includes the ticket message, the ticket message being valid for one time slot, as defined by the network, and including a digital signature, calculated on the basis of a key which is used only during a time slot in which said ticket message was generated.

9. A method as claimed in claim 8, wherein when a transmission including the ticket message has been completed, the network sends to the first network user a second ticket message containing connection information, the second ticket message being valid for a further one time slot.

10. A method of reserving network resources for a transmission from a first network user, the method comprising:

receiving at a node in the network a resource reservation request from the first network user to initiate a reservation;

confirming that the required resource is available on a link from said node;

sending from the network to the first network user a ticket message containing all necessary connection information; and allowing access to the network for a transmission from the first network user when the transmission includes the ticket message, wherein the determination as to whether the required resource is available on the link is made at a central resource controller.

11. A method as claimed in claim 10, wherein the central resource controller controls the allocation of resources within a subnetwork made up of a plurality of nodes.

* * * * *